United States Patent [19]

McMahon et al.

[11] Patent Number: 4,715,028

[45] Date of Patent: Dec. 22, 1987

[54] OPTICAL COMMUNICATION SYSTEM

[75] Inventors: Donald H. McMahon, Carlisle; Gilbert L. Johnson, Jr., Marlborough, both of Mass.

[73] Assignee: Polaroid Corporation, Cambridge, Mass.

[21] Appl. No.: 874,118

[22] Filed: Jun. 13, 1986

[51] Int. Cl.$^4$ .............................................. H04B 9/00
[52] U.S. Cl. ............................................ 370/3; 372/20; 455/607; 455/612
[58] Field of Search ............ 370/3; 455/610, 612, 455/607, 617; 350/96.16, 96.15; 372/18, 20

[56] References Cited

U.S. PATENT DOCUMENTS 4,592,043  5/1986  Williams ................................ 370/3
4,616,898  10/1986  Hicks, Jr. ............................. 455/612

Primary Examiner—Joseph A. Orsino, Jr.
Attorney, Agent, or Firm—Francis J. Caufield

[57] ABSTRACT

An optical communications system includes an optical bus and a plurality of terminal devices coupled to the bus and a reference signal generator for propagating a reference signal through the bus for use by all terminal devices in selecting one of a predetermined number of frequency distinct communications channels. The reference signal is frequency swept in a recurring manner between two fixed frequencies and is introduced onto the system bus, along with a system synchronization signal, for propagation to bus tap resonators associated with the terminal devices in the system. Each terminal device detects the moment at which the swept reference frequency passes through one of the resonant modes of its bus tap resonator and determines the elapsed time thereof from the system synchronization signal. The respective bus tap resonator can be controlled, for example, by controlling its operating temperature, so that the reference frequency passes through the resonant mode of the terminal devices bus tap resonator at a selected time after the occurrence of the system synchronization signal to thus correspond to a frequency distinct communications frequency.

42 Claims, 28 Drawing Figures

OPTICAL COMMUNICATION SYSTEM

BACKGROUND OF THE INVENTION

The present invention relates to optical communications networks. More particularly, it concerns systems and methods for effecting reliable and accurate frequency control within optical communications networks.

Various information multiplexing arrangements, including time division multiplexing (TDM) and frequency division multiplexing (FDM), can be used for transferring information within an optical communications network. With time division multiplexing, information is transmitted in predetermined time slots relative to a recurring system timing cycle, and with frequency division multiplexing, information is transmitted simultaneously on frequency distinct carriers or channels. Accurate timing devices are required in time division multiplexing systems while accurate frequency determining and controlling devices are required in frequency division multiplexing systems to create and maintain many independent frequency distinct information channels.

In the suboptical portion of the electromagnetic spectrum, accurate and highly reliable frequency determining devices have been developed to allow the creation of sophisticated frequency division multiplexing systems at reasonable cost. At optical frequencies, however, corresponding frequency determining devices have not yet become available. In optical systems, various devices are known for providing a time invariant frequency output that can be used as a frequency reference. In general, such devices are too expensive or complicated to allow widespread implementation in an optical communication system. For example, the absorption or emission spectra of certain plasmas such as sodium or cesium can be utilized as a time invariant frequency reference. Additionally, certain gas lasers such as the He-Ne laser can likewise provide a time invariant output at a known frequency. These devices while providing the desired output pose a number of drawbacks from a practical standpoint. In general a highly stable output frequency is available at one or a few frequencies, which frequencies may or may not be desirable for establishing communications channels. In addition the cost of these devices can be inconsistent with inexpensive optical communications networks having many terminal devices especially where each terminal device must include a local frequency reference.

SUMMARY OF THE INVENTION

In view of the above, the present invention provides an optical communications system having a system bus and a plurality of terminal devices coupled to the system bus for communications with one another. An optical energy source introduces a system reference signal onto the optical bus for distribution to all terminal devices in the network to establish a system wide frequency reference from which all terminal devices can determine and select a frequency distinct channel for communications. The frequency of the reference signal is swept, that is, caused to vary, in a periodic manner to cover a range between first and second known frequencies. Each terminal device in the system includes an optical resonant structure which is responsive to the frequency swept reference signal. A control parameter is used to control the resonant structure to preferentially support optical energy at a selected channel frequency. Accordingly, the resonant structure of two or more terminal devices can be similarly controlled, responsive to the frequency swept reference signal, to enable communication.

In the preferred form of the invention, the system reference signal source includes an inherently stable optical frequency reference, such as a gas laser, and a resonant cavity, such as a Fabry Perot resonator, which supports a plurality of resonant modes determined, in part, by the optical path length and the resonant characteristics of the resonant cavity. The resonant characteristics of the cavity are controlled, for example, by varying its operating temperature, so that one of the resonant modes is frequency locked to the frequency of the gas laser to thus accurately establish the frequency of all the other resonant modes supported in the cavity. A controllable optical source, such as a semiconductor laser, is excited by a drive current so that the frequency of its output is made to vary, for example, in a linear manner, during an accurately predetermined time period between two adjacent resonant modes of the frequency stabilized resonant cavity. In addition, a system wide gate or synchronization signal is generated at the beginning of each frequency sweep cycle for use by a terminal device in selecting a particular communications channel. The frequency varying reference signal and the synchronization signal are transmitted on the system bus for distribution throughout the system and for use by each terminal device.

Each terminal device includes a resonator structure, such as a bus tap resonator, which is coupled to the system bus with the various resonators designed to have similar controllable resonant characteristics. Control is accomplished by controlling an operating parameter, such as the operating temperature, of the resonator structure to control the total number of resonant modes supported and their free spectral range. Each terminal device receives the system synchronization signal and responds to measure the time interval from the synchronization signal to the time that the frequency of the system reference signal sweeps through a resonant mode of the terminal device's resonant structure, this elapsed time representative of the frequency difference between the resonant modes which establish the limits of the frequency of system reference signal and the associated resonant mode in the terminal device's resonant structure. A particular frequency may be selected for communications by controlling the elapsed time from the occurrence of system synchronization signal to the time the frequency of the system reference signal passes through the associated resonant mode. Thus, any two terminal devices can communicate on a common frequency by controlling their respective bus tap resonators so that the frequency of the system reference signal passes through the corresponding resonant mode in the respective bus tap resonators after an identical time period has elapsed from the occurrence of the system synchronization signal.

A principal objective of the present invention is, therefore, the provision of an improved frequency control system and method for optical communications networks which establishes accurate and stable frequency distinct channels for communications. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
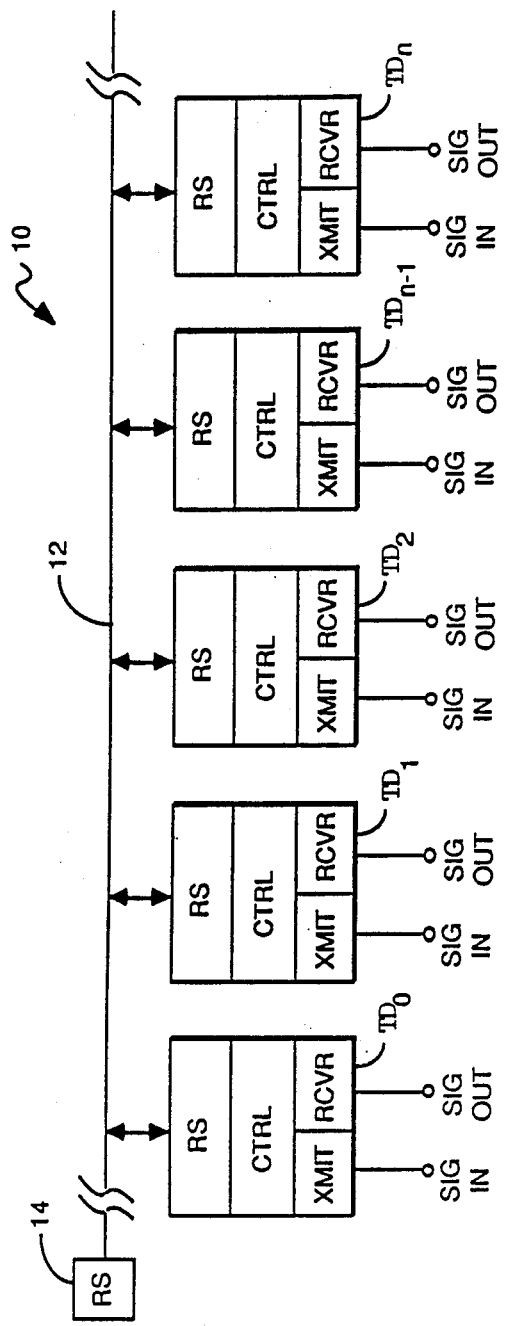
FIG. 1 is a schematic block diagram of an optical communications system in accordance with the present invention.

An optical communications system in accordance with the present invention is shown in general form in FIG. 1 and designated therein by the reference character 10. As shown, the system 10 includes a system communications bus 12, preferably in the form of a single mode optical fiber, an optical reference signal source 14 coupled to one end of the bus 12 for providing a system wide frequency reference signal, and a plurality of terminal devices $TD_0$, $TD_1$, $TD_2$, . . . $TD_{n-1}$, $TD_n$ coupled to the communications bus 12 for communications with one another. While the system 10 is shown as an open bus arrangement, other network configurations, such as closed loops or star configurations are likewise suitable.

As discussed more fully below, each terminal device TD includes a resonant structure RS of the same general physical and optical characteristics, such as a resonant optical loop, and which preferentially supports light energy at selected wavelengths, that is, resonant modes, which are a function of the physical and optical characteristics of the resonant structure RS. Where the various resonant structures RS have identical optical characteristics, the resonant structure RS will support the same set of resonant modes with the same free spectral range between each mode within the set. In addition to a resonant structure RS having similar optical characteristics, each terminal device TD includes, as described more fully below, a controller CTRL for controlling the optical characteristics of the respective resonant structure RS so that the optical characteristics can be varied in a controlled manner to change the frequency at which the resonant modes of a particular resonant structure occur. A transmitter XMIT which propagates an information bearing signal in response to information presented at a SIG IN input and receiver RCVR which provides a recovered information signal at a SIG OUT output are likewise provided to allow duplex communications, although transmit only or receive only terminal devices TD can be provided.

Figure 2A:
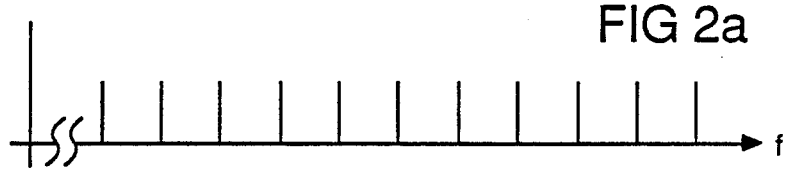
FIGS. 2a and 2b are graphical representations of first and second sets of resonant modes.
Figure 2B:
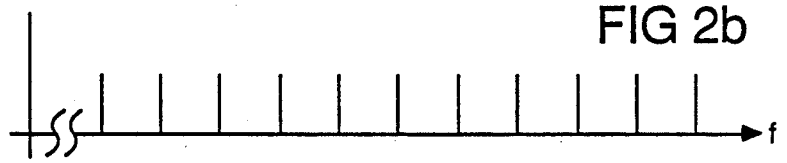
Figure 3A:
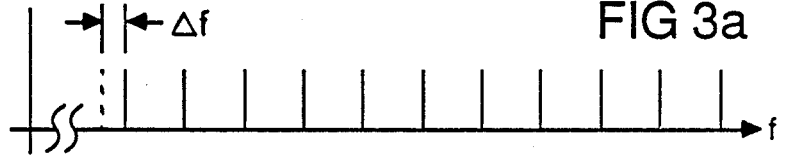
FIGS. 3a and 3b are graphical representations of third and fourth sets of resonant modes that are offset in frequency from the first and second sets of resonant modes of FIGS. 2a and 2b.
Figure 3B:
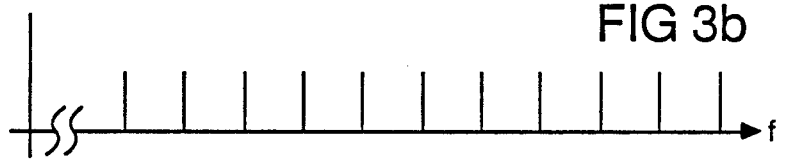

The various resonant structures RS are tuned by controlling the frequency at which their resonant modes occur, for example, by controlling their respective operating temperatures. The resonant structures can be controlled, as shown in FIGS. 2a and 2b, so that the resonant modes occur at the same frequencies. Thus, an information signal transmitted by an originating terminal device $TD_o$ at a frequency corresponding to one of the resonant modes of FIG. 2a will be preferentially supported by the corresponding resonant mode supported by the resonant structure of a destination terminal device $TD_d$ as shown in FIG. 2b. In contrast to FIGS. 2a and 2b, the resonant structures RS may be controlled to support a different set of resonant modes in which the modes occur at different frequencies to thus define a frequency distinct communications channel. As shown in FIGS. 3a and 3b, the resonant modes for originating and destination terminal devices $TD_o$ and $TD_d$ are coincident with one another to allow mutual communications but are offset by a frequency different $\Delta f$ from the resonant modes of the sets presented in FIGS. 2a and 2b. The frequency offset $\Delta f$ is sufficiently large to accommodate the bandwidth of the transmitted information with minimum or otherwise acceptable levels of inter-channel crosstalk.

Figure 4:
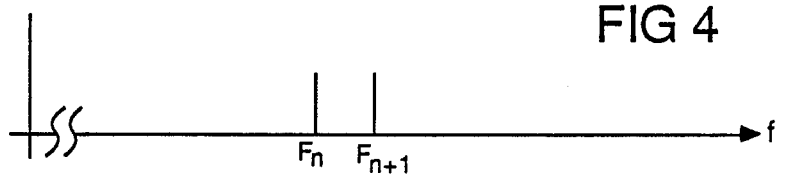
FIG. 4 represents two spaced apart frequencies $F_n$ and $F_{n+1}$ provided by a system reference signal for controlling the frequencies of the resonant modes of FIGS. 2a, 2b, 3a, and 3b.

As shown in FIG. 4 and as explained in detail below, the system reference source 14 provides a reference signal that periodically varies in time between reference frequencies $F_n$ and $F_{n+1}$ with a system gate or synchronization signal transmitted when the system reference signal is at either the frequency $F_n$ or the frequency $F_{n+1}$. The terminal devices TD detect each system synchronization signal and enabled to determine the time when the frequency of the system reference signal coincides with, that is, sweeps through, the corresponding resonant mode of the terminal device resonant structure RS. The frequency at which the resonant modes occur for any set of resonant modes is controlled by controlling the time period from the occurrence of the system synchronization signal to the time that the system reference frequency signal sweeps through the corresponding resonant mode.

Figure 5:
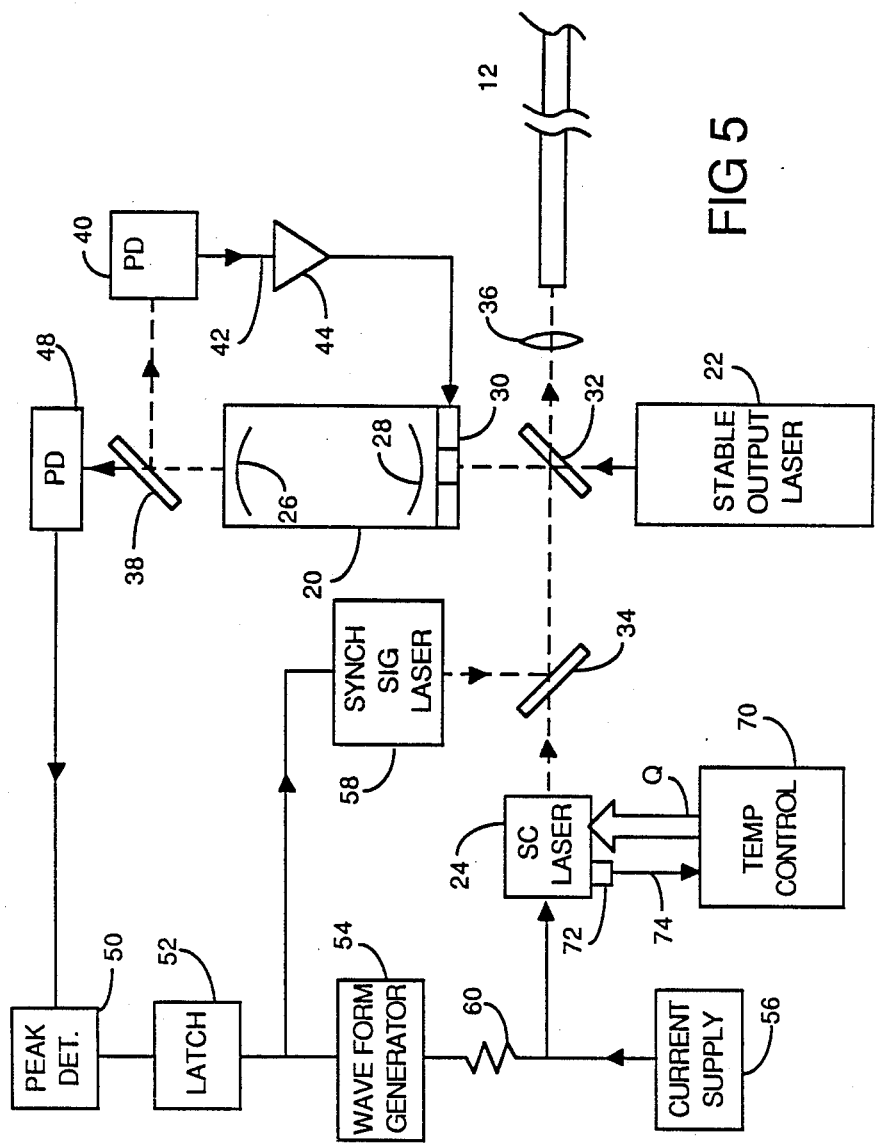
FIG. 5 is a schematic block diagram of an analog system reference source.

An exemplary system reference source 14 for providing a system wide reference signal which periodically varies in frequency between first and second reference frequencies $F_n$ and $F_{n+1}$ and which provides a system wide synchronization signal for use by the terminal devices TD is shown in FIG. 5. The system reference source 14 includes a controllable resonant cavity defined herein as the system cavity 20, a He-Ne laser 22 which provides a highly stable output at a preferred frequency (633 nm.) for stabilizing the resonant cavity 20, and a controllable semiconductor laser 24 for introducing the frequency sweeping reference signal onto the system bus 12. The semiconductor laser diode 24 preferably provides an output in the vicinity of 1300 nm., although outputs in the 800 to 1800 nm. range are suitable.

The system cavity 20 is defined by spaced semi-reflecting mirrors 26 and 28, or equivalent devices, which are separated by a transmissive medium in a manner analagous to a Fabry Perot resonator. An electrically driven piezoelectric transducer 30 is mounted at one end of the system cavity 20 and is driven, as described below, to physically stress the system cavity 20 to alter its resonant characteristics. The system cavity 20 receives light from both the He-Ne gas laser 22 and the controllable semiconductor laser 24. The light output of the He-Ne laser 22 is transmitted through a beam splitter 32 into the system cavity 20 while the light output of the semiconductor laser 24 is directed through a semi-reflecting mirror 34 or equivalent device to the beam splitter 32 where a portion of the light is transmitted through the beam splitter 32 and a lens 36 into the end of the optical fiber system bus 12 and the remaining portion of the light is reflected by the beam splitter 32 into the system cavity 20. An optical isolator (not shown), which may take the form of a magnetic isolator or an acousto-optic modulator used as an isolator, can be inserted into the optical path at the output of the laser diode 24 to avoid optical feedback from any other components in the system 10.

The light exiting the system cavity 20, which includes light from both the He-Ne gas laser 22 and the controllable semiconductor laser 24, is directed to a color separation beam splitter 38, which can take the form of an interference filter, which is effective to filter or separate the light output of the system cavity 20 into light energy of predetermined bands. More specifically, light energy in the red portion of the optical spectrum corresponding to the output frequency (633 nm.) of the He-Ne laser 22 is reflected into an optical detector 40 which provides a corresponding electrical output along circuit path 42 to a control amplifier 44 which, in turn, is connected to and drives the piezoelectric transducer 30. Light corresponding the output wavelength (e.g., 1300 nm.) of the semiconductor laser diode 24 is transmitted through the interference filter 38 to a photodetector 48, which may take the form of a PIN diode.

The system cavity 20 will support light energy at wavelengths, viz., resonant modes, that are an integral number of half wavelengths of the effective optical path length of the cavity 20. The piezoelectric transducer 30, under the excitation of the output of the amplifier 44, physically stresses the system cavity 20 to alter its resonant characteristics, this is, the frequency at which the resonant modes occur and the intermode free spectral range. The interference filter 38, the detector 40, the amplifier 44, and the piezoelectric transducer 30 define a control loop that controls the system cavity 20 to lock one of the resonant modes to the frequency of the output of the He-Ne laser 22 to thus establish the frequency of all the other resonant modes supported in the cavity 20, including resonant modes occurring in the frequency range produced by the semiconductor laser 24. More specifically, the intensity of the light entering the detector 40 is a function of the intensity of the light emitted by the He-Ne laser 22 and the resonant characteristics of the system cavity 20. Where the frequency of a resonant mode of the system cavity 20 is identical to the frequency of the light emitted by the He-Ne laser 22, the intensity of the light and the electrical output of the detector 40 will be a maximum. Conversely, the intensity of the light entering the detector 40 and its electrical output will be less than a maximum where none of the resonant modes supported in the system cavity 20 are coincident in frequency with the output of the He-Ne laser 22. The electrical output of the detector 40 is presented to the amplifier 44 which, in turn, provides an output voltage to the piezoelectric transducer 30 to alter the resonant characteristics of the system cavity 20 so that the frequency of one of the resonant modes will continuously correspond to the frequency of the He-Ne laser 22. As can be appreciated, the frequency of all the supported resonant modes will thus likewise be stabilized relative to the resonant mode locked to the output frequency of the He-Ne laser 22.

The semiconductor laser diode 24 presents its light output through the semi-reflecting mirror 34 and the beam splitter 32 with a major portion of the light transmitted through the beam splitter 32 and the lens 36 into the optical fiber 12 and with a portion of the remaining light reflected by the beam splitter 32 into the system cavity 20. The frequency of the light output of the laser diode 24, as explained below, is varied in frequency throughout a range which includes two adjacent resonant modes of the frequency stabilized system cavity 20. As the frequency of the laser diode 24 output sweeps through a resonant mode of the system cavity 20 the amplitude of the light exiting the system cavity 20 increases sharply to present a light pulse through the color interference separator 38 to the photodetector 48 which provides an output current pulse, as shown in graphical form in FIG. 6a, in response to the optical pulse provided from the system cavity 20.

Figure 6A:
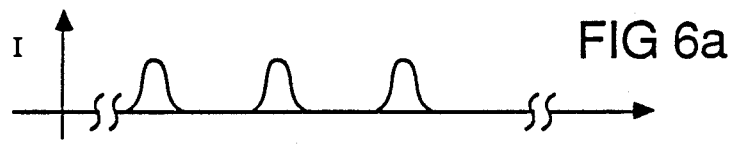
FIGS. 6a-6d are idealized graphical timing diagrams of various waveforms generated in the analog system reference source of FIG. 5.
Figure 6B:
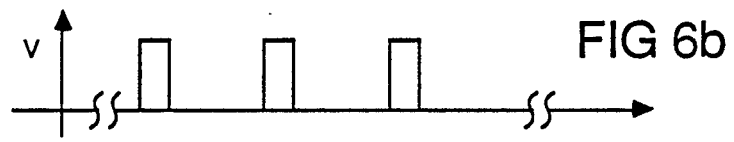
Figure 6C:
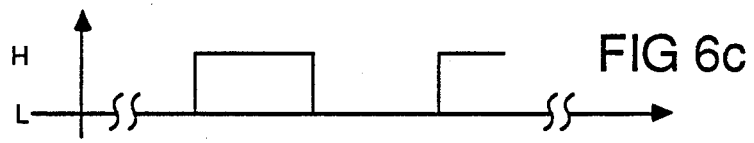

The output of the photodetector 48 is provided to a control loop which includes a peak detector 50, a bistable latch 52, a triggerable waveform generator 54, and a stabilized current supply 56. The current output of the photodiode 48, shown in FIG. 6a, is provided to the peak detector 50 which provides a conditioned output pulse, shown in FIG. 6b, having steep leading and trailing edges with the trailing edge coincident with the maxima of the pulse output of the photodiode 48. The conditioned pulses are provided to the bistable latch 52, such as a D-type flip flop, which provides alternating set and reset outputs, as shown in FIG. 6c, with each successive input pulse from the peak detector 50. The output of the bistable latch 52 is used to provide both the system gate or synchronization signal and to control the waveform generator 54.

A laser diode 58 is connected to the output of the bistable latch 52 and directs its light output to the semi-reflecting mirror 34 which reflects the light energy through the beam splitter 32 and the lens 36 into the optical fiber bus 12 for propagation throughout the system 10. While different synchronization protocols are possible, the laser 58 is excited when the output of the bistable latch 52 is HI and is not excited when the output of the bistable latch 52 is LO. The frequency of the optical synchronization signal is chosen so as to be displaced from the communications frequencies with the terminal devices TD receiving the synchronization signal independently of any communications signals. In addition to providing a laser diode 58 to generate an optical synchronization signal, other arrangements may be used, for example, the synchronization signal can be provided electrically to each terminal device $TD_n$ using a separate electrical path.

Figure 6D:
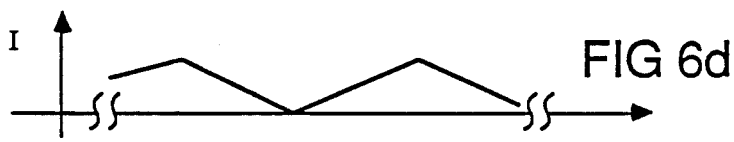
Figure 7A:
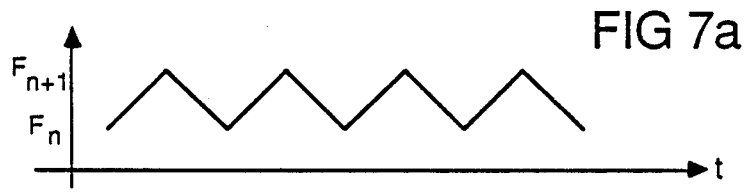
FIGS. 7a and 7b are idealized graphical representations, respectively, of the frequency variation with time of the system reference signal and a system gate or synchronization signal.
Figure 7B:
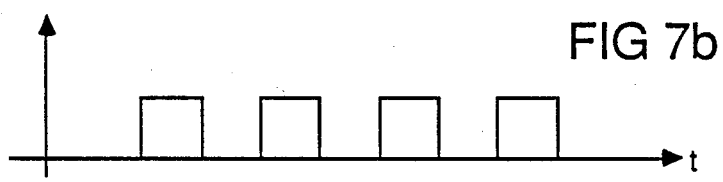

The waveform generator 54 generates a periodically recurring inclining and declining ramp waveform, as shown in FIG. 6d, with ramp transitions coinciding with the transitions of the output of the bistable latch 52. The output of the waveform generator 54 is connected through a series resistor 60 to the current supply 56 and to the input of the semiconductor laser diode 24. The drive current to the semiconductor laser diode 24 is the cumulative output of the current supply 56 and the waveform generator 54 and is thus varied in a periodic manner to cause a corresponding variation in the optical frequency generated by the laser diode 24. As shown in FIG. 7a, the frequency varies with time between a first frequency $F_n$ and a second frequency $F_{n+1}$ with the system synchronization signal undergoing a transition with each frequency maxima $F_{n+1}$ or minima $F_n$. The variation in output frequency from $F_n$ to $F_{n+1}$ corresponds to the free spectral range between two resonant modes of the system cavity 20. In general, a cycle rate of 0.01 seconds with a frequency excursion of 50 GHz is sufficient to effect frequency stabilization for resonator filters having a free spatial range less than 50 Gigahertz. A semiconductor laser diode 24 having a frequency/current factor of 5 GHz/mA can provide the 50 GHz frequency excursion with a current variation of 10 mA.

A temperature controller 70 maintains the temperature of the laser diode 24 at a constant value and includes a sensor 72 which provides a temperature indication along path 74 to the temperature controller 70 which, in turn, provides varying amounts of thermal energy along a thermal path Q to the laser diode 24 to effect the desired temperature control.

Figure 8:
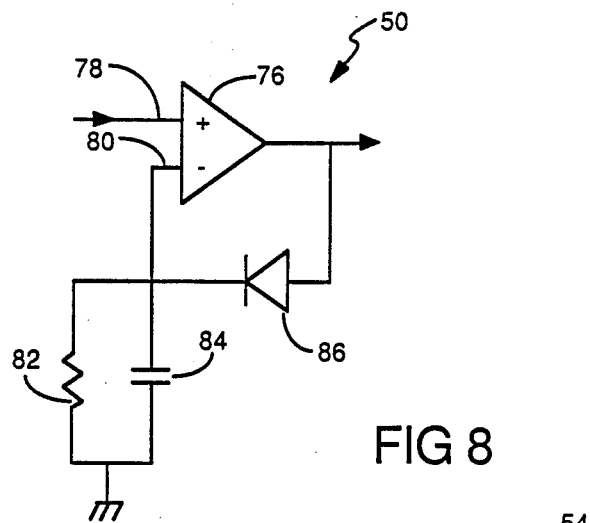
FIG. 8 is a schematic diagram of a peak detector.
Figure 9:
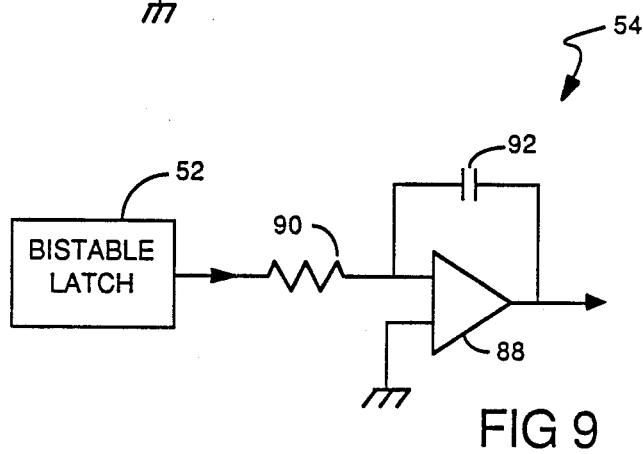
FIG. 9 is a schematic diagram of a waveform generator.

A representative circuit for the peak detector 50 is illustrated in FIG. 8, and a representative circuit for the waveform generator 54 is illustrated in FIG. 9. In FIG. 8, an operational amplifier 76 has one input 78 coupled to the photodetector 48 to sense the current pulses and its other input 80 coupled to an RC circuit that includes a resistor 82 and a capacitor 84 with feedback provided through a diode 86. In operation, the output of the amplifier 76 is held high for the rising portion of the input pulse from the photodetector 48 until the maxima is reached at which time the output falls sharply to provide the steep trailing edge for triggering the bistable latch 52.

As shown in FIG. 9, the waveform generator 54 includes an operational amplifier 88 coupled to the output of the bistable latch 52 through an input resistor 90 with feedback provided through a capacitor 92. The capacitor 92 integrates the output of the amplifier 88 with polarity periodically reversed by the state change output of the bistable latch 52.

Figure 10:
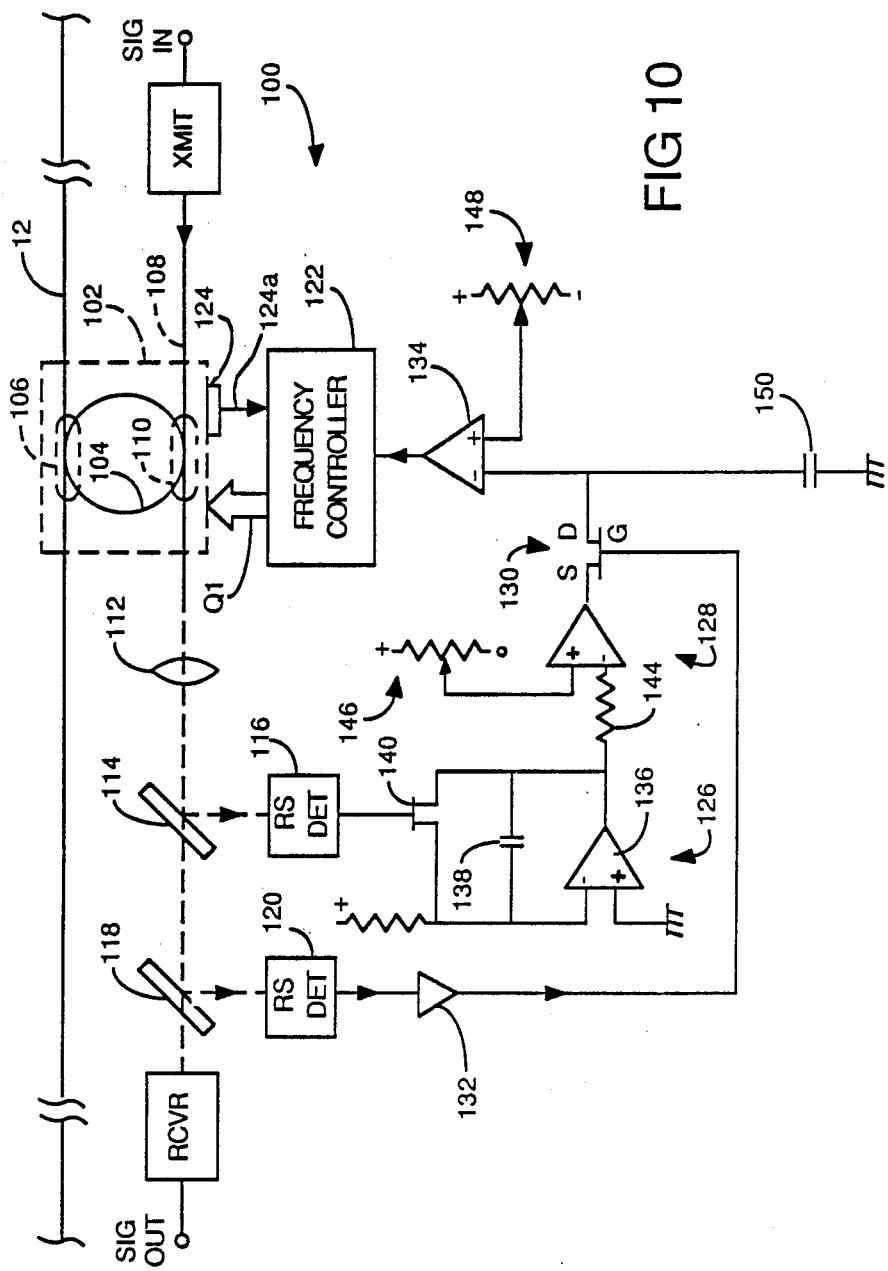
FIG. 10 is a schematic block diagram of a terminal device that uses the system reference and synchronization signals provided by the system frequency reference source to acquire a selected communications channel.

A terminal device TD which utilizes the swept frequency system reference signal and the system synchronization signal for frequency control and communications channel selection is shown in FIG. 10 and designated generally therein by the reference character 100. As shown, the terminal device 100 includes a bus tap resonator 102 which includes a resonant cavity loop 104 coupled to the system bus 12 through a lateral coupling 106 and to an optical fiber coupling link 108 through another lateral coupling 110. The resonant cavity loop 104 has an effective optical length which will resonantly support those wavelengths that are an integer number of its effective optical length, including the frequencies provided by the system frequency source 14.

A transmitter XMIT and a receiver RCVR are positioned at opposite ends of an optical circuit which includes the optical coupling link 108, a lens 112 for directing light into and out of the end of the optical coupling link 108, a first frequency selective interference filter 114 positioned to direct light energy corresponding to the frequency of the system synchronization signal into a synchronization signal detector 116, and a second frequency selective interference filter 118 positioned to reflect light energy corresponding to the frequencies $F_n$ and $F_{n+1}$ of the system reference signal into the reference signal detector 120. The detectors 116 and 120 can take the form of PIN diodes, for example. Information signals are propagated from the transmitter XMIT, in response to information provided at the SIG IN input, along the optical coupling link 108 and are coupled through the lateral coupling 110 into the resonant cavity loop 104 and then through the lateral coupling 106 into the system bus 12 for propagation to other terminal devices TD in the network. Conversely, information bearing signals propagated on the system bus 12 are coupled through the lateral coupling 106 into the resonant cavity loop 104 and through the lateral coupling 110 into the optical coupling link 108 for propagation through the lens 112 and the interference filters 114 and 118 to the receiver RCVR where the information bearing signal is demodulated and the recovered information content provided at a SIG OUT output.

A frequency controller 122, such as a thermal control, controls the bus tap resonator 102 to control the frequencies at which the resonant modes occur within the resonant cavity loop 104 and their free spectral range. The temperature of the bus tap resonator 102 is sensed by a sensor 124 which provides a control signal output along circuit path 124a to the temperature controller 122 which provides varying amounts of thermal energy along thermal path Q1. The thermal frequency controller 122 increases or decreases the temperature of the bus tap resonator 102 in response to a control circuit that includes a resettable integrator 126, a comparator 128, a field effect transistor (FET) switch 130 driven by an amplifier 132, and an amplifier 134 for providing a control signal to the thermal frequency controller 122.

The resettable integrator 126 includes an operational amplifier 136 with feedback between the output and the inverting input provided by a capacitor 138. A field effect transistor (FET) switch 140 has its source and drain connected across the capacitor 138 and is periodically gated between its respective ON and OFF states in response to the output of the detector 116 to periodically shunt the capacitor 138, as described below.

The comparator 128 includes an operational amplifier 142 having its inverting input connected through a series resistor 144 to the output of the operational amplifier 136 and its noninverting input connected to a controllable potential source, such as a potentiometer 146.

The potentiometer 146, as described below, functions as a frequency control for selecting or changing the frequencies at which the resonant modes occur in the bus tap resonator 102.

The output of the operational amplifier 142 is provided through the switch 130 to the inverting input of the amplifier 134. The switch 130 takes the form of a field effect transistor (FET) having its source and drain terminals connected between the output of the operational amplifier 142 and the inverting input of the amplifier 134. The amplifier 132 is connected to the gate of the FET switch 130 and periodically gates the switch 130 between its respective OFF and ON states. The noninverting input of the operational amplifier 134 is connected to a voltage potential source, such as an adjustable potentiometer 148 connected between oppositely poled sources.

Figure 11A:
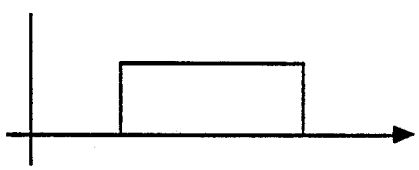
FIGS. 11a-11e are idealized graphical representations of various waveforms generated in the terminal device of FIG. 10.
Figure 11B:
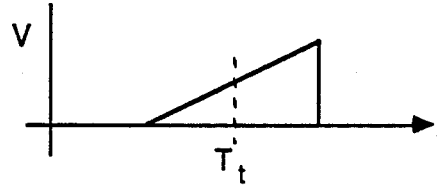

The optical system synchronization signal transmitted on a recurring basis from the system reference source 14 is reflected through the interference filter 114 to the detector 116 with the electrical output of the detector 116, as shown in FIG. 11a, alternating between relative HI and LO values. The output of the detector 116 controls the FET switch 140 to periodically open and close a shunt path across the capacitor 138. The resettable integrator 126 is normally operative, when the FET switch 140 is open (that is, ungated by the output of the detector 116) to generate an increasing ramp output as the capacitor 138 is charged, as shown in FIG. 11b. Upon the next transition of the FET switch 140 to the ON (closed) state, in response to the output of the detector 116, the capacitor 138 is shunted to cause the output of the operational amplifier 136 to drop LO with the ramp generation recurring upon the next system reference signal transition.

Figure 11C:
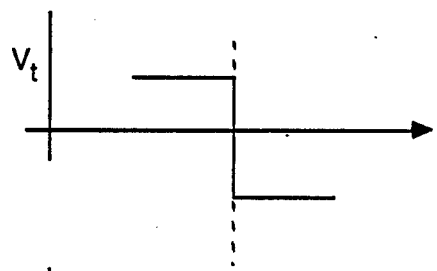

The output waveform of the operational amplifier 136 is presented to the inverting input of the amplifier 142 which effects a comparison with the user determined potential provided to the noninverting input from the potentiometer 146. The comparator 128 is preferably provided with high gain characteristics so that its output will remain positive during the time that the ramp input is less than the user determined potential and will switch rapidly through zero to the negative side when the ramp input exceeds the user determined potential. In FIG. 11c, it is assumed, for the purposes of explanation, that the user determined potential $V_t$ and the rising value of the ramp are equal at the approximate midpoint of the ramp so the comparator changes polarity at time $T_t$. As can be appreciated, a lower user determined potential will cause the comparator 128 to switch polarity in a shorter time period as measured from the system synchronization signal and a higher user determined potential will increase the time period in which the output of the comparator 128 switches polarity. Thus, the source terminal of the FET switch 130 is either positive or negative at a predetermined time from the beginning of the system cycle, depending upon the user determined potential.

Figure 11D:
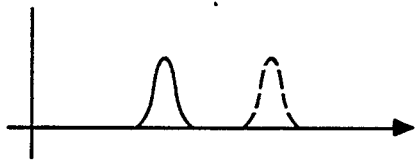
Figure 11E:
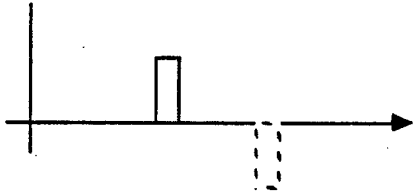

The FET switch 130 is periodically turned ON and OFF for short periods of time corresponding to and in response to the output of the amplifier 132 which, in turn, is driven by the output of the detector 118 during those moments that the sweeping reference signal frequency sweeps through a resonant mode of the bus tap resonator 102. Thus, the moment a resonant peak is detected by the detector 120, the drain terminal of the FET switch 130 provides a positive pulse, as represented in solid line illustration in FIGS. 11d and 11e, if the instantaneous ramp value is less than the user determined potential. Conversely, a negative pulse is provided if the instantaneous ramp value is greater than the user determined potential, as represented in dotted line illustration in FIGS. 11d and 11e. The output of the FET switch 130 is provided to a capacitor 150 and the inverting input of the operational amplifier 134. The noninverting input of the operational amplifier 134 is connected to the potentiometer 148 connected between positive and negative supplies. The capacitor 150 and related circuitry preferably have a high impedance to allow the capacitor 150 to charge with and retain the cumulative positive or negative pulse energy. Where the output pulses are predominantly positive, the capacitor will charge to and retain a net positive potential to cause the amplifier 134 to increase the operating temperature of the bus tap resonator 102 and increase the free spectral range between the resonant modes. Conversely, where the pulses are predominantly negative, the capacitor 150 will accumulate a predominate negative charge and the amplifier 134 will cease increasing the thermal energy provided to the bus tap resonator 102. The system drives to an equilibrium point in which the net results of the various positive and negative pulses will prevent the net charge on the capacitor 150 from increasing or decreasing to thus maintain the operating temperature and optical characteristics of the bus tap resonator 102 constant. Where it is desired to change the frequency at which the resonant modes in the bus tap resonator occur, that is, tune the bus tap resonator 102 to another communications channel, the user determined potential provided through the potentiometer 146 is changed to change the relative time at which the comparator 126 changes state and thus change the ratio of positive and negative pulses provided to the capacitor 150.

Further disclosure relating to frequency stabilization and thermal control of resonant cavities and bus tap resonators may be had in commonly assigned and copending U.S. patent application Ser. No. 811,775, filed Dec. 20, 1985 and entitled "WAVELENGTH MULTIPLEXED OPTICAL COMMUNICATIONS SYSTEM AND METHOD" and U.S. patent application, Ser. No. 783,436, filed Oct. 3, 1985 and entitled "OPTICAL COMMUNICATION SYSTEM EMPLOYING FREQUENCY REFERENCE", the disclosures of which are incorporated herein to the extent necessary to practice the present invention.

Figure 12:
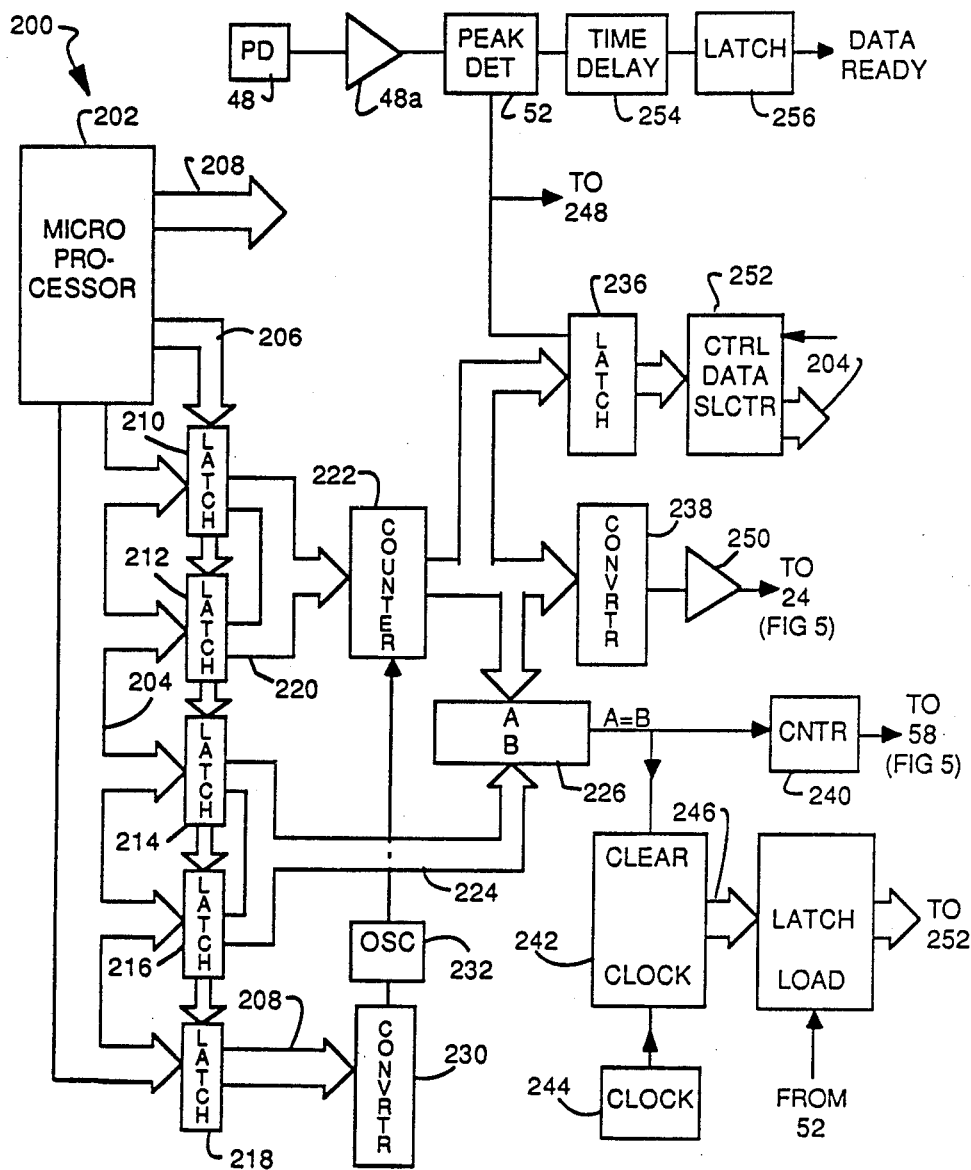
FIG. 12 is a schematic block diagram of a digital system reference signal source.

A digital embodiment of the system reference source 14 is illustrated in FIG. 12 and is designated generally therein by the reference character 200. As shown therein, the system reference signal source 200 includes a microprocessor 202 preferably having on-chip RAM and ROM and which effects overall control, as explained below, through a data bus 204, an address bus 206 and a control bus 208 which may include one or more separate control lines. The data bus 204, which is preferably an 8 bit bus, is connected to the parallel inputs of latches 210, 212, 214, 216 and 218 with the address and control busses 206 and 208 similarly connected to the latches so that a data word placed on the data bus 204 by the microprocessor 202 can be selectively loaded into one or more of the latches 210–218. The 8 bit outputs of the latches 210 and 212 are combined into a 16 bit bus 220 for presentation to the parallel data input of a 16 bit counter 222 which can be preset in response to an appropriate "load" command to load the binary word presented by the latches 210 and 212 through the bus 220. The 8 bit outputs of the latches 214 and 216 are presented through a combined 16 bit bus 224 to one input, viz., the "B" input, of a 16 bit A/B comparator 226 which compares the output of the latches 214 and 216 presented through the bus 224 with the output of the counter 222 presented through the bus 234 to the "A" input of the comparator 226 as described more fully below.

The output of the latch 218 is presented through an 8 bit bus 228 to the parallel input of a digital to analog converter 230 which provides, in response to the value of the binary word presented at its input, a corresponding analog control output to a voltage controlled oscillator 232. The pulse output of the voltage controlled oscillator 232, which has a variable pulse repetition rate, is provided to the clock input of the counter 222 to control the incrementing rate of the counter 222. The output of the counter 222 is provided through a 16 bit bus 234 to the "A" input of the comparator 226, to a 16 bit latch 236, and to a digital to analog converter 238.

The comparator 226, when the count presented on the bus 234 from the counter 222 equals the value presented on the bus 224 from the latches 214 and 216, presents an appropriate control command to a bistable latch 240 and to the clear input of a counter 242. The output of the bistable latch 240 controls the laser diode 58 (FIG. 5) to provide the system synchronization signal as described above. The counter 242 functions as a resettable timer and is incremented in response to the output of a fixed rate clock 244. The parallel output of the counter 242 is presented through a bus 246 to the parallel input of a latch 248. A signal from the peak detector 52, as described below, loads the instantaneous value of the counter 242 into the latch 248.

The digital to analog converter 238 accepts the incrementing count of the counter 222 and presents a time varying current output through the amplifier 250 to the laser diode 24, which, in turn, provides a frequency varying system reference signal to the system bus 12. The latch 236 accepts the 16 bit word provided by the counter 222 and presents the word to the data selector 252 which in response to an appropriate control signal presents the 16 bit word to the data bus 204.

The photodetector 48, an amplifier 48a, and the peak detector 52 function as described above in relation to FIG. 5 to provide a trigger pulse (FIG. 6b) to cause the latch 236 to load the instantaneous count on the bus 234 from the counter 222 and the latch 248 to load the count presented from the counter 242. The same peak trigger pulse is also proved through a time delay 254 to the bistable latch 256 for providing a "data ready" signal to the microprocessor 202 and to enable reading of the count values of the latch 236 and the latch 248.

Figure 13A:
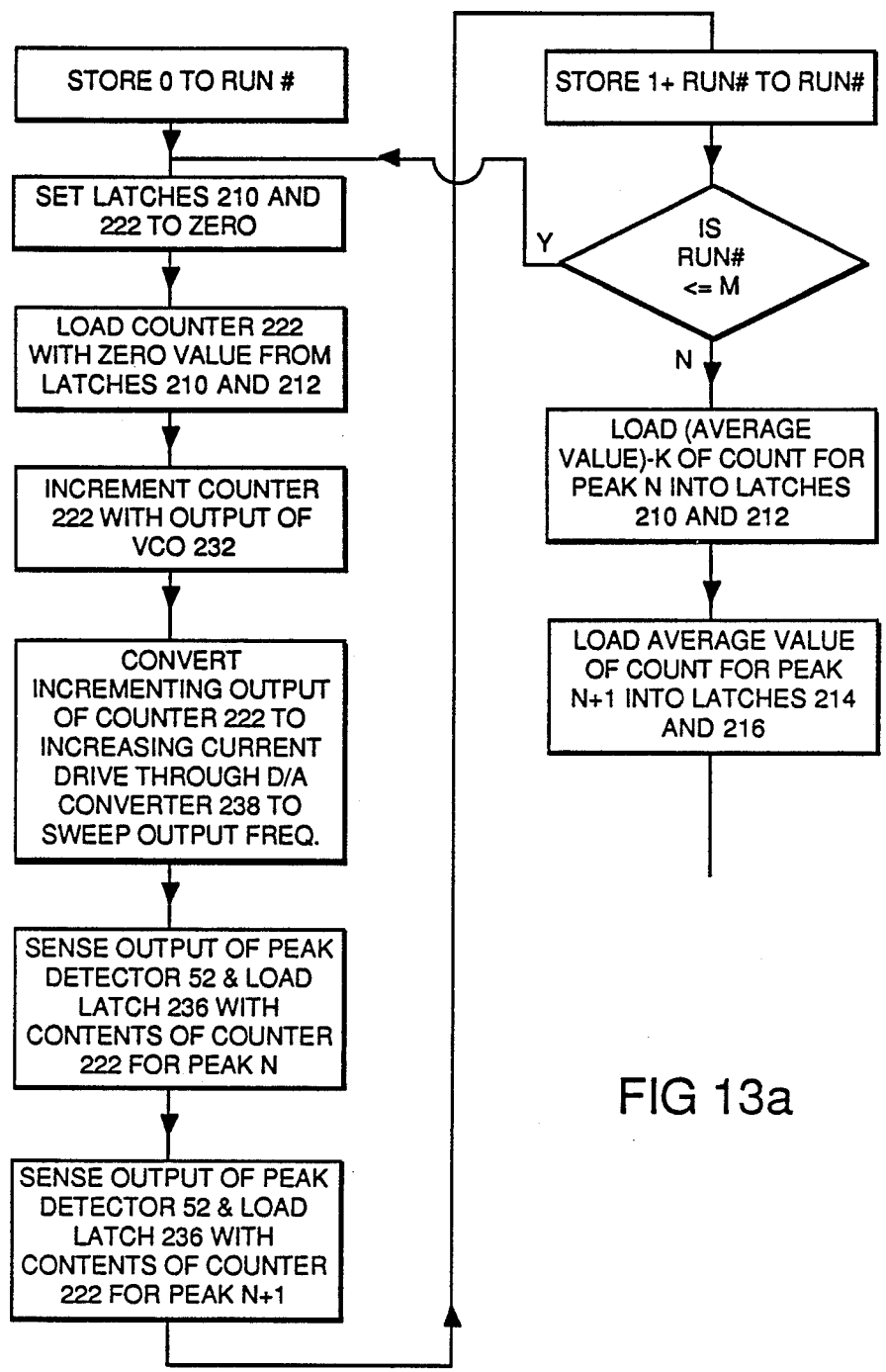
FIGS. 13a and 13b represent a flow diagram illustrating a control sequence for the digital system reference signal source of FIG. 12.
Figure 13B:
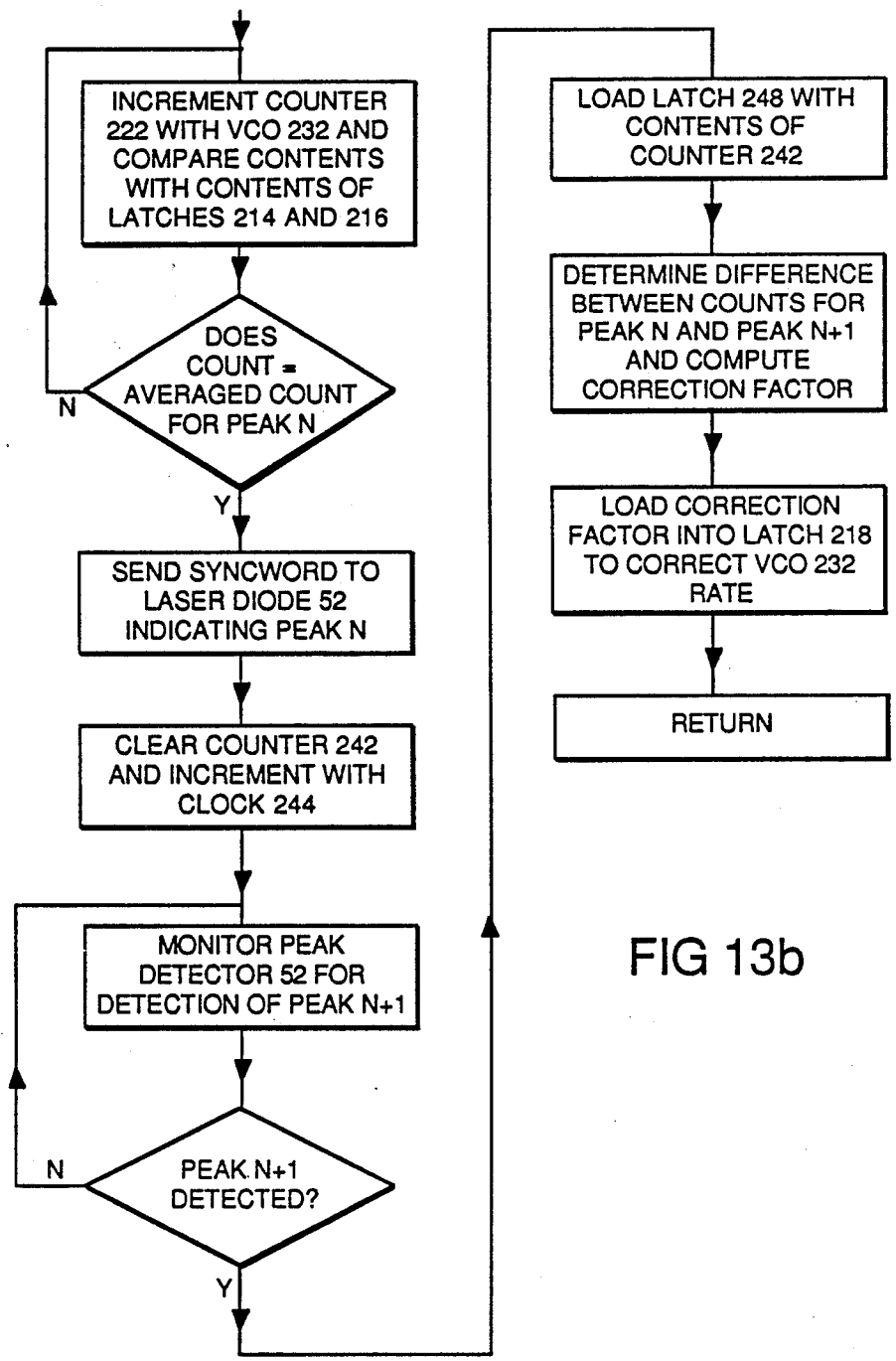

The digital system reference source 200 functions through an initialization and control sequence, as shown in the flow diagram of FIGS. 13a and 13b. As shown therein, an arbitrary run number (RUN #) is stored and the latches 210 and 212 initially set to zero and the zero count is then loaded into the counter 222. The voltage controlled oscillator 232 then increments the counter 222 with the digital to analog converter 238 increasing the current presented through amplifier 250 to the laser diode 24 (FIG. 5) to cause the frequency of the output of the laser diode 24 to similarly increase with time. When the peak detector 52 senses the moment that the frequency of the laser diode 24 passes through the associated resonant mode N of the system cavity 20, a "detect" signal to the latch 236 loads the instantaneous value of the count contained in the counter 222. In an analagous manner, the next "detect" signal again loads the instantaneous value of the count contained in the counter 222 upon detection of the next resonant peak which occurs when the output frequency of the laser diode 24 sweeps through the next resonant mode N+1 of the system cavity 20 (FIG. 5). The "detect" signal is time delayed through the time delay 254 to provide a clocking signal to the bistable latch 256 which provides a "data ready" signal to the microprocessor 202 to read the latched counts through the data selector 252. The sequence is repeated through M runs until average count values are obtained for the count status of counter 222 for the resonant modes N and N+1. Thereafter the latches 210 and 212 are loaded with the average count for the Nth resonant mode minus an arbitrary value K so that the actual loaded count is below the computed average, and the latches 214 and 216 are loaded with the actual average count of the Nth resonant mode. The counter 222 is loaded with the below average value set in latches 210 and 212 and its count incremented in response to the pulse output of the voltage controlled oscillator 232. The comparator 226 compares the upwardly incrementing contents of the counter 222 with the average value count in latches 214 and 216 and, when the two values are equal, sends a synchronization signal to clear the counter 242 and set the bistable latch 240, which, in turn drives the laser diode 58 (FIG. 5) to provide the system synchronization signal. The cleared counter 242 immediately reincrements in response the output of fixed rate clock 244. Both the counter 222 and the counter 240 continue to increment until the next peak "detect" signal loads the latch 236 with the output of the counter 222 and loads the latch 248 with the contents of the counter 240 with the contents of the latches read by the microprocessor 202. The difference between the counts of counters 248 and 222 is then used to generate a correction value which the microprocessor 202 loads into latch 218 for presentation through the bus 228 to digital to analog converter 230 which provides a control voltage which changes the repetition rate of the output of the voltage controlled oscillator 232 to change the rate at which the counter 222 is incremented. Accordingly, the incrementing rate of the counter 222 can be either stepped up or stepped down to minimize the difference value between the counters 248 and 222 to provide a system reference frequency that varies between the frequencies $F_n$ and $F_{n+1}$ established between adjacent resonant modes N and N+1 of the system cavity 20.

Figure 14:
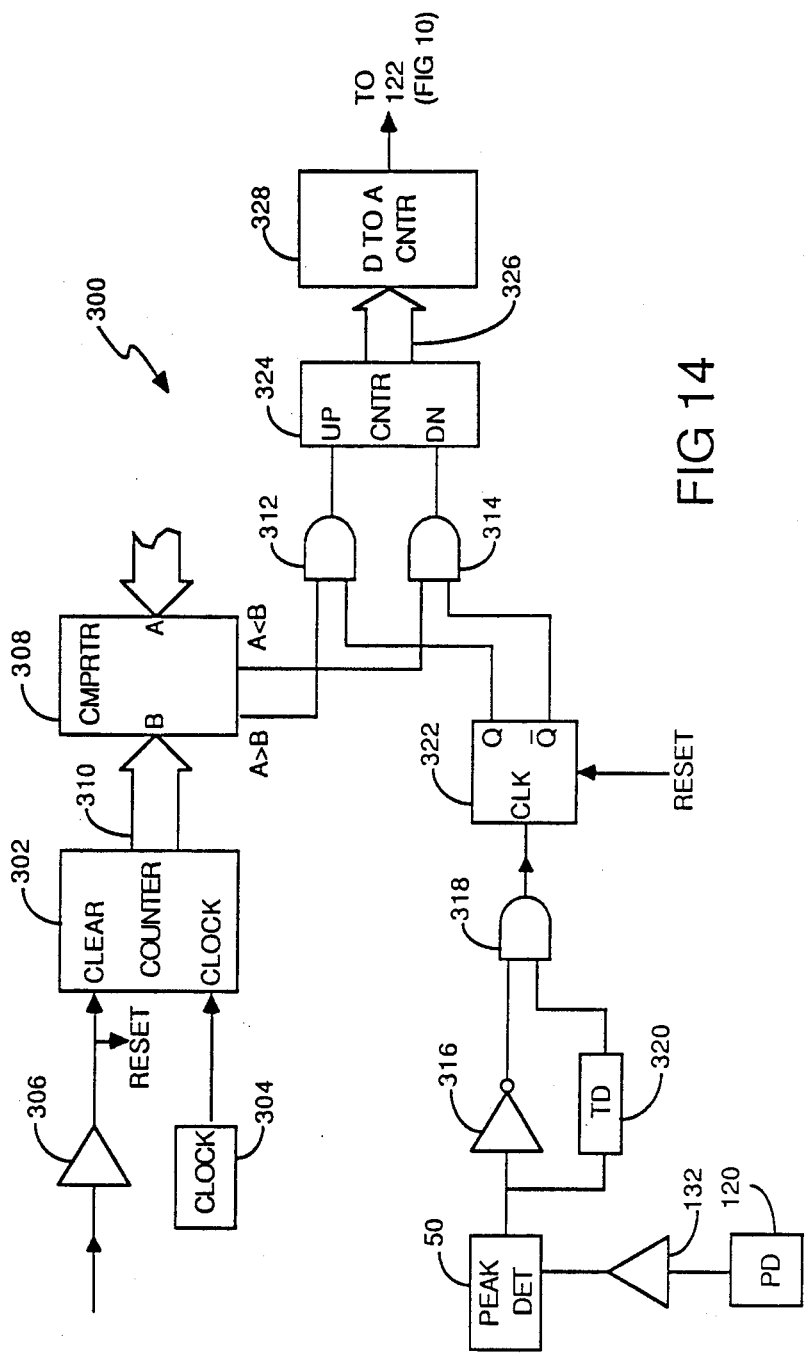
FIG. 14 is a schematic block diagram of a controller for controlling the communications frequencies of the various terminal devices in the system.

An exemplary digital controller for the bus tap resonators 102 (FIG. 10) of the various terminal devices TD is shown in FIG. 14 and designated therein generally by the reference character 300. As shown, a resettable counter 302 is incremented by clock pulses from a fixed rate clock 304 and periodically reset to zero in response to the system synchronization signal provided through buffer 306 to the clear input of the counter 302. A comparator 308, having parallel input ports 'A' and 'B', compares the instantaneous count provided to its 'B' port from the counter 302 through a bus 310 with a predetermined reference word provided at its 'A' port. The comparator 308 provides two outputs, A>B and A<B, to the inputs of the two respective AND gates 312 and 314.

Figure 15:
FIGS. 15a-15e are idealized graphical representations of various waveforms generated in the controller of FIG. 14.

A detector 120 (FIG. 10) senses the optical peak which occurs when the frequency of the system reference signal sweeps through the associated resonant mode N of the bus tap resonator 102 (FIG. 10) and provides its electrical output to the amplifier 132 and to the peak detector 50, which, as described above, provides output pulses having steep leading and trailing edges with the trailing edge corresponding in time to the maxima of the output of the amplifier 132, as shown in FIGS. 15a and 15b. An inverter 316 inverts the output of the peak detector 50 and presents the inverted signal (FIG. 15c) to one input of an AND gate 318 with the output of the peak detector 50 also provided through a time delay 320 to the other input of the AND gate 318. The time delay 320 delays the noninverted output (FIG. 15d) of the peak detector 50 to delay gating of the inverted pulse so that the trailing edge serves to clock a bistable latch 322 which provides its Q and $\overline{Q}$ outputs, respectively, to inputs of the AND gates 312 and 314. The bistable latch 322 is reset in response to the system synchronization signal which also resets the counter 302. The outputs of the AND gates 312 and 314 are provided, respectively, to the UP and DOWN inputs of the up/down counter 324. The contents of the counter 324 are provided through a bus 326 to a digital to analog counter 328 which provides a corresponding control signal to the thermal controller 122 (FIG. 10) to control the resonant characteristics of the controlled bus tap resonator 102.

Figure 16:
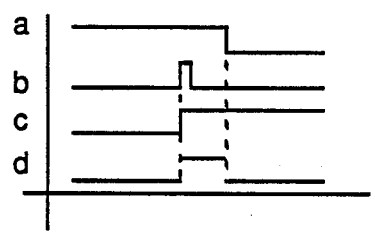
FIG. 16a-16d are idealized graphical representations of various waveforms generated in the controller of FIG. 14 in a first control mode.
Figure 17:
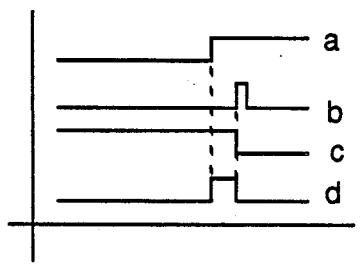
FIG. 17a-17d are idealized graphical representations of various waveforms generated in the controller of FIG. 14 in a second control mode.

At the beginning of each system cycle, the system synchronization signal clears the counter 302 and resets the bistable latch 322 with the counter 302 immediately reincrementing in response to the output of the clock 304. During the time that the contents of the counter 302, that is, the 'B' value, is less than the reference word 'A' value, the control output of A>B will be HI and the control output A<B will be LO. When the contents of the counter 302 equals the value of the reference word, both the control outputs A>B and A<B will be momentarily LO. Conversely, when the contents of the counter 302 exceed the reference word value, the control output A>B will be LO and the control output A<B will be HI. As the frequency of the system reference signal sweeps through the resonant mode N of the bus tap resonator 102, an electrical pulse from the detector 120 generates a trigger pulse at the output of the peak detector 50 which, in turn, generates the clocking pulse for the bistable latch 322 to cause it to switch states to enable the counter 324 for either up or down counting, depending upon the timing of the peak "detect" trigger pulse. Where a trigger pulse is detected (FIG. 16b) when the counter control output A>B is HI (FIG. 16a), the bistable latch 322 (FIG. 16c) is clocked to enable the counter 324 to count up and thus provide a first count value through the digital to analog converter 328 to the temperature controller 132 (FIG. 10) to control the temperature of the bus tap resonator 102. Conversely and as shown in FIG. 17, where the control output A<B is HI (FIG. 17a), the detection of a resonant peak generates a trigger pulse (FIG. 17b) to reset the bistable latch 322 to enable the counter 324 for down counting (FIGS. 17c and 17d) to thus reduce the count content of the counter 324 and cause the digital analog converter 328 to reduce the value of its control signal to the temperature control 132. Optimally, the detection of the resonant peak and the generation of the trigger pulse occur concurrently with equivalence between the contents of the counter 302 and the reference word so that the counter 324 will be neither enabled for up or down counting and an equilibrium point is attained.

In the discussion of the invention presented above, the system reference frequency has been described as a "sweep" frequency between frequencies $F_n$ and $F_{n+1}$ as established by the system cavity 20 to provide frequencies to which all the bus tap resonators 102 in the system are offset in frequency or otherwise referenced. The sweep rate, that is df/dt can be linear or nonlinear, as desired. Additionally, a "digital" sweep can be provided, that is, a series of discrete optical energy pulses of fixed or varying time duration can be provided with each successive pulse increasing in frequency in a stepwise manner.

The present invention, thus advantageously provides a system and method by which optical communications system need only have a single high accuracy frequency reference through which all terminal wavelength selective filters in the system can be accurately tuned to one or more communications frequencies. Highly accurate frequency control is achieved without the need for frequency standards or references at each terminal device but by requiring only accurate timing devices to determine the system timing cycle and the occurrence of a resonant peak at a local bus tap resonator relative to a system synchronization signal.

Thus, it will be appreciated from the above that as a result of the present invention, a highly effective frequency control system and method for optical communications systems is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. An optical communications system, comprising:
   an optical pathway for propagating information bearing light signals;
   at least first and second terminal devices coupled to said optical pathway for effecting communications through said optical pathway, each of said terminal devices including a controllable resonant structure controlled to support a plurality of resonant modes occurring at respective resonant mode frequencies;
   means for propagating a reference signal onto said optical pathway, said reference signal varying in frequency between at least a first and one other reference frequency in a periodic manner; and
   means for controlling said resonant structure of each of said terminal devices to support resonant modes at respective resonant mode frequencies having a selected frequency relationship with at least one of the first and one other reference frequency.

2. The optical communications system of claim 1 wherein said means for controlling comprises:
   means for detecting the frequency of the reference signal propagated on said optical pathway and for detecting coincidence in frequency between between the reference signal and the frequency of a supported resonant mode in said resonant structure of said terminal device.

3. The optical communications system of claim 2 wherein said means for controlling further comprises:

means for maintaining a selected time relationship between said first and second mentioned detections.

4. The optical communications system of claim 2, wherein said means for propagating presents a synchronization signal to said terminal devices when said reference signal is at the first or one other reference frequency.

5. The optical communications system of claim 4, wherein said synchronization signal is propagated in said optical pathway.

6. The optical communications system of claim 4, wherein said means for controlling comprises:
means for detecting the synchronization signal.

7. The optical communications system of claim 6, wherein said means for controlling further comprises:
means for maintaining a selected time relationship between said first and second mentioned detections.

8. The optical communications system of claim 7, wherein said means for controlling comprises:
means for thermally controlling respective resonant structures to control the timed relationship between said first and second mentioned detections.

9. The optical communications system of claim 1, wherein said means for propagating a reference signal comprises:
means defining an optical resonator for supporting a plurality of resonant modes occurring at respective resonant mode frequencies including the first and one other reference frequency.

10. The optical communications system of claim 9, wherein said optical resonator means comprises a bounded optical resonator cavity.

11. The optical communications system of claim 9, further comprising:
means for controlling said optical resonator to control the frequencies at which the respective resonant modes occur.

12. The optical communications system of claim 11, further comprising:
means defining a controllable variable frequency optical source for introducing variable frequency optical energy into said optical resonator means.

13. The optical communications system of claim 12, further comprising:
control means for controlling said variable frequency optical source to vary its frequency between first and second resonant modes of said optical resonator corresponding in frequency to the first and one other reference frequency.

14. The optical communications system of claim 13, further comprising:
means defining a synchronization signal generator for introducing a synchronization signal onto said optical pathway when the frequency of said variable frequency optical source is at either said first or one other frequency.

15. An optical frequency referencing system, comprising:
an optical pathway for propagating light signals;
a terminal device coupled to said optical pathway for receiving light signals therefrom, said terminal device including a controllable resonant structure controlled to support a plurality of resonant modes occurring at selected resonant mode frequencies;
means for propagating a reference signal onto said optical pathway, said reference signal varying between at least a first and one other reference frequency in a periodic manner; and
means for controlling said resonant structure to support resonant modes at resonant mode frequencies having a selected frequency relationship relative to at least one of said first and one other reference frequency.

16. The optical frequency refrencing system of claim 15, wherein said resonant structure controlling means comprises:
means for detecting the frequency of the reference signal propagated on said optical pathway and for detecting coincidence in frequency between the reference signal and the frequency of a supported resonant mode in said resonant structure.

17. The optical frequency referencing system of claim 16, wherein said resonant structure controlling means further comprises:
means for maintaining a selected time relationship between said first and second mentioned detections.

18. The optical frequency referencing system of claim 15, wherein said means for propagating a reference signal propagates a synchronization signal to said terminal devices when said reference signal is at the first or one other reference frequency.

19. The optical frequency referencing system of claim 18, wherein said synchronization signal is propagated on said optical pathway.

20. The optical frequency referencing system of claim 18, wherein said resonant structure controlling means comprises:
means for detecting the synchronization signal and for detecting coincidence in frequency between the reference signal and the frequency of a supported resonant mode in said resonant structure of said terminal device.

21. The optical frequency referencing system of claim 20, wherein said resonant structure controlling means comprises:
means for thermally controlling said resonant structures to control the timed relationship between said first and second mentioned detections.

22. The optical frequency referencing system of claim 15, wherein said means for propagating a reference signal comprises:
means defining an optical resonator for supporting a plurality of resonant modes occurring at respective resonant mode frequencies including the first and one other reference frequency.

23. The optical frequency referencing system of claim 22, wherein said optical resonator means comprises a bounded optical resonator cavity.

24. The optical frequency referencing system of claim 22, further comprising:
means for controlling said optical resonator to control the frequencies at which the respective resonant modes occur.

25. The optical frequency referencing system of claim 24, further comprising:
means defining a controllable variable frequency optical source for introducing variable frequency optical energy into said optical resonator means.

26. The optical frequency referencing system of claim 25, further comprising:
control means for controlling said variable frequency optical source to vary its frequency between first and second resonant modes of said optical resonator corresponding in frequency to the first and one other reference frequency.

27. The optical frequency referencing system of claim 26, further comprising:
means defining a synchronization signal generator for introducing a synchronization signal onto said optical pathway when the frequency of said variable frequency optical source is at either the first or one other frequency.

28. An optical frequency reference comprising:
means defining a resonant cavity controllable to support selected sets of resonant modes at respective resonant mode frequencies;
a fixed frequency optical source for providing a fixed frequency optical output to said resonant cavity means;
means coupled to said resonant cavity means for controlling said resonant cavity means to maintain the frequency of a resonant mode of the supported set of resonant modes substantially constant relative to the fixed frequency output of said fixed frequency optical source;
a variable frequency optical source for providing a portion of its output to said resonant cavity means; and
means coupled to said resonant cavity means and to said variable frequency optical source for controlling said variable frequency optical source to vary its frequency between a first and at least one other frequency coinciding substantially with the frequencies of a first and at least one other resonant mode of the set of resonant modes supported in said cavity.

29. The optical frequency reference of claim 28, comprising:
means defining a synchronization signal generator for generating a synchronization signal when the frequency of said variable frequency optical source is at either said first or other frequency.

30. The optical frequency reference of claim 28, wherein said means for controlling said variable frequency optical source comprises:
means for detecting coincidence in frequency between the variable frequency output of said variable frequency optical source and the frequencies of the first and at least one other resonant mode and for controlling said variable frequency optical source in response thereto.

31. The optical frequency reference of claim 30, further comprising:
means defining a synchronization signal generator for generating a synchronization signal when the frequency of said variable frequency optical source is at the frequency of either said first and at least one other frequency.

32. The optical frequency reference of claim 30, wherein said variable frequency optical source comprises an electrically controllable laser diode.

33. The optical frequency reference of claim 32, wherein said means for detecting and controlling comprises:
a detector coupled to said resonant cavity for detection of optical peaks occurring when the output frequency of the variable frequency optical source coincides in frequency with the frequency of a resonant mode supported in said resonant cavity; and
means defining a controllable electrical source responsive to said detector for successively increasing and decreasing the electrical energy presented to said laser diode in response to successive optical peak detections.

34. The optical frequency reference of claim 33, wherein said controllable electrical source means comprises:
a waveform generator responsive to successive optical peak detections to present successive increasing and decreasing electrical current values to said laser diode.

35. The optical frequency reference of claim 33, wherein said controllable electrical source means comprises:
a digital counter successively counting in response to a count pulse source between lower and upper count values in response to successive optical peak detections; and
a digital to analog converter, coupled to said digital counter for providing a successively increasing and decreasing electrical energy value to said laser diode in response to successive optical peak detections.

36. A terminal device for effecting communications at selectable optical frequencies, comprising:
a resonant structure coupled to an optical pathway through which optical signals are propagated at selected frequencies, said resonant structure controllable to support selected sets of resonant modes at respective resonant mode frequencies;
means for sensing a periodically occurring synchronization signal propagated through a synchronization signal pathway;
means for sensing a reference signal propagated through said optical pathway which periodically varies in frequency with time between a first and at least one other reference frequency and for sensing the moment of coincidence of frequency between the varying frequency reference signal and the frequency of a resonant mode;
means for detecting the time between the occurrence of said synchronization signal and the moment of frequency coincidence; and
control means for controlling said resonant structure to support a selected set of resonant modes with a selected resonant mode coinciding in frequency with the referenced signal a selected time after the occurrence of the synchronization signal.

37. The terminal device of claim 36, wherein said control means comprises:
a thermal controller for controlling the resonant characteristics of said resonant structure;
said first and second mentioned means for sensing providing respective first and second electrical responses to said control means, said second response initiating time integration of a value and said first response gating the time integrated value to said thermal controller.

38. The terminal device of claim 37, wherein said control means further comprises:
a resettable analog integrator for integrating an electrical value with time.

39. The terminal device of claim 37, wherein said control means further comprises:
a resettable digital integrator for integrating successive electrical pulses with time.

40. A frequency referencing and control method for an optical communications system comprising the steps of:
propagating a variable frequency optical signal on an optical pathway, the frequency of which varies between first and second frequencies in a recurring manner;
presenting the variable frequency optical signal to an optical resonator that supports resonant modes at respective resonant mode frequencies;
detecting frequency coincidence between a resonant mode and the variable frequency optical signal; and
controlling the optical resonator to maintain a selected time interval between the frequency coincidence detection and time the variable frequency optical signal is at one of the first and second frequencies.

41. The frequency referencing and control method for an optical communications system of claim 40, further comprising the step of:
propagating a synchronization signal when the variable frequency optical signal is at the first or second frequencies.

42. A method of controlling the resonant frequency of a resonant structure coupled to the optical pathway of an optical communications system, comprising the steps of:
propagating a frequency reference signal onto the optical pathway, the frequency reference signal varying in frequency with time in a periodic manner between at least a first and one other frequency; and
controlling the resonant structure to support a set of resonant modes at respective resonant mode frequencies including one resonant mode occurring at a frequency between the first and the other frequencies so that the frequency of the one resonant mode coincides with that of the time varying frequency of the reference signal at a predetermined time after coinciding with at least one of the first and the other frequencies.

* * * * *